United States Patent
Maffre et al.

(10) Patent No.: US 8,515,015 B2
(45) Date of Patent: Aug. 20, 2013

(54) METHOD AND SYSTEM FOR TEST AUTOMATION AND DYNAMIC TEST ENVIRONMENT CONFIGURATION

(75) Inventors: Scott C. Maffre, Frederick, MD (US); Ravikumar V. Alligala, Herndon, VA (US); Jorden K. Epps, Greenbelt, MD (US); Rick L. Halstead, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1256 days.

(21) Appl. No.: 12/118,473

(22) Filed: May 9, 2008

(65) Prior Publication Data

US 2009/0279673 A1    Nov. 12, 2009

(51) Int. Cl.
*H04M 1/24* (2006.01)
*H04M 3/08* (2006.01)
*H04M 3/22* (2006.01)

(52) U.S. Cl.
USPC .......................................................... 379/10.01

(58) Field of Classification Search
USPC ........................................ 379/10.01; 702/119
See application file for complete search history.

(56) References Cited

U.S. PATENT DOCUMENTS 7,181,360 B1 * 2/2007 Nikolac et al. ................ 702/119
2003/0093238 A1 * 5/2003 Hsieh et al. .................... 702/121

* cited by examiner

*Primary Examiner* — Alexander Jamal

(57) ABSTRACT

A method and system of an embodiment may provide a user interface enabling automated testing of a network device. The automated testing may include specifying a network device to be tested, specifying a network technology for testing the network device, specifying a client of the network device, configuring network connectivity for the network device, and enabling execution by the client of a network device of a test action. Configuring network connectivity may include dynamically configuring a network to include the specified network technology and the specified network device.

22 Claims, 4 Drawing Sheets

METHOD AND SYSTEM FOR TEST AUTOMATION AND DYNAMIC TEST ENVIRONMENT CONFIGURATION

BACKGROUND INFORMATION

Software and hardware testing personnel are challenged with reducing testing time and expense. Testing and quality assurance personnel are also faced with finding ways and methods to improve testing accuracy, ensure software and hardware quality and to ensure compatibility of software and hardware with other products or systems. Software and hardware testing may test a product in a complex environment, such as a complex multi-faceted network, in order to simulate actual product usage and performance.

Testing hardware or software in a network environment may require multiple components as well as significant configuration of hardware, software and network resources. Testing hardware or software for a network service provider, a network operator, or a network owner may require testing not only of hardware and software owned by a network service provider, but also hardware and software owned by a user. This may greatly increase the types, manufacturers, models and versions of software and hardware required to be tested. Additionally, hardware and software may vary for each type of network service offered. A service provider may be under pressure to rush to support the latest hardware, software, update, upgrades and other components used by clients or other network users. The challenge to accurately test an increasing number of complex configurations while ensuring the accuracy and thoroughness of the testing may be significant.

BRIEF DESCRIPTION OF THE DRAWINGS

In order to facilitate a more comprehensive understanding of the exemplary embodiments, reference is now made to the appended drawings. These drawings should not be construed as limiting, but are intended to be exemplary only.

DETAILED DESCRIPTION OF PREFERRED EMBODIMENTS

An exemplary embodiment provides a test automation and dynamic test environment configuration system to one or more testers, test leads or other quality assurance personnel. The test automation and dynamic test environment configuration system may enable a user to automate one or more portions of testing and test environment configuration.

Figure 1:
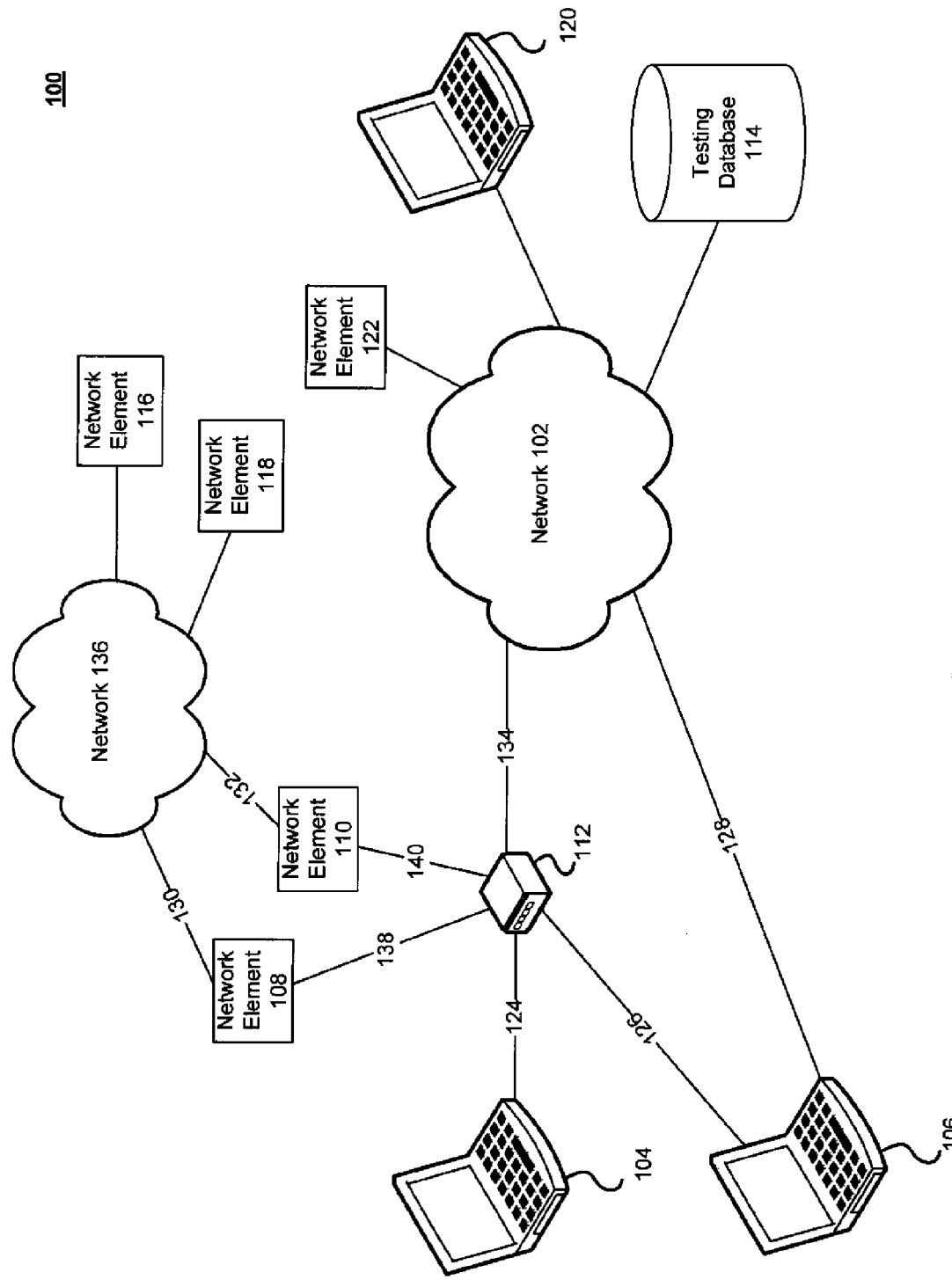
FIG. 1 is a test automation and dynamic test environment configuration system, in accordance with an exemplary embodiment.

Referring to FIG. 1, a test automation and dynamic test environment configuration system in accordance with an exemplary embodiment is illustrated. System 100 illustrates an exemplary system for test automation and dynamic test configuration. It is noted that System 100 is a simplified view of a network and may include additional elements that are not depicted. As illustrated, network 102 may represent a management or administrative network connecting one or more testing environments. Network clients 104 and 106 may be communicatively coupled to network 102 via network paths 124, 126, and 134 and network connectivity device 112. Network clients 104 and 106 may be communicatively coupled to network 102 via additional network paths. For example, network client 106 is depicted as being communicatively coupled to network 102 via network path 128. Additional devices may be communicatively coupled to network 102. Network element 122 may be a testing server, which may facilitate testing and configuration of one or more test components. Testing database 114 may be a database or other storage communicatively coupled to network 102. Testing interface 120 may be a computer communicatively coupled to network 102 which may provide an interface for a user of system 100. Network 136 may represent a network utilized for testing. Network 136 may be communicatively coupled to tested network elements 108 and 110 via network paths 130 and 132. Network connectivity device 112 may be communicatively coupled to tested network elements 108 and 110 via network paths 138 and 140. Network clients 104 and 106 may be communicatively coupled to network 136 via network paths 124, 126, 138 and 140 and network connectivity device 112. Additional devices may be communicatively coupled to network 136. Network elements 116 and 118 may be servers or other network devices providing one or more network services to a user of network 136.

Tested network elements 108 and 110 may be devices that a network owner, operator, user or service provider desires to test. Tested network elements may be Customer Premises Equipment (CPE) such as, but not limited to, a broadband router, a modem, a set top box, a digital video recorder, a voice over IP analog telephone adapter, a wireless access point, and an Optical Network Terminal (ONT). Customer premises equipment may include equipment of a customer or a network service provider which may be similar to equipment which may be located at a customer location and may provide or utilize network connectivity or network services. Tested network elements 108 and 110 may be wireline phones, cellular phones, mobile phones, or satellite phones, Personal Digital Assistants (PDA), computers, handheld MP3 players, handheld video players, personal media players, watches, gaming devices, televisions, or other devices capable of utilizing one or more network services. Equipment located at a network service provider's location may also be tested.

Network paths 130 and 132 may be one or more network connections utilized to test a tested network element's performance, security and compatibility with one or more network technologies. For example, network paths 130 and 132 may be network connections utilizing Digital Subscriber Line (DSL), Asymmetric Digital Subscriber Line (ADSL), Symmetric Digital Subscriber Line (SDSL), Very High Speed DSL (VDSL), Single Pair High Speed Digital Subscriber Line (G.SHDSL), Fiber To The Premises (FTTP), cable modem broadband, leased line, Integrated Services Digital Network (ISDN), dial-up, satellite, wireless networking, broadband over power lines, IP over coaxial cable, a Multimedia Over Coax Alliance (MoCA) compliant technology, or other network technologies. Although network paths 130 and 132 are depicted connecting to network 136, in some embodiments network paths 130 and 132 may enable connectivity to other networks. In some embodiments, separate network paths may be utilized for testing and testing control. For example, network paths 130 and 132 may be connections utilized for testing and network paths 128 and 134 may be network paths utilized for testing control.

Network connectivity device 112 may be a router, a switch or other network connectivity device. Network connectivity device 112 may enable a Virtual Local Area Network (VLAN), a Virtual Private Network (VPN), and/or a Virtual Private LAN Service (VPLS). Network connectivity device 112 may enable the connection of a network client to a plurality of tested network devices via the creation of a VLAN. Network connectivity device 112 may be dynamically configurable, which may enable a client to utilize different tested network devices depending on the configuration of a VLAN. For example, network connectivity device 112 may be configured such that network client is on the same VLAN as network element 108 while network client 106 is on a separate VLAN with network element 110. Network connectivity device 112 may thus enable the dynamic configuration of multiple testing environments containing one or more network clients, tested network elements and/or network paths. Network connectivity device 112 may dynamically configure ports or other interfaces, such as ports connected to network paths 138 and 140, to enable the configuration of one or more VLANs VPNs or other dynamically configured testing environments.

Networks 102 and 136 may be one or more Local Area Networks (LANs), Wide Area Networks (WAN), the Internet, cellular networks, satellite networks or other networks that permit transfer and/or reception of data to and/or from one or more network elements. Networks 102 and 136 may utilize one or more protocols of network clients and/or network elements. Networks 102 and 136 may translate to or from other protocols to one or more protocols of a network client or a network element.

Network clients 104 and 106, network connectivity device 112 and tested network elements 108 and 110 may transmit and/or receive data to and/or from networks 102 and 136 representing testing data. The testing data may be transmitted and/or received utilizing a standard telecommunications protocol or a standard networking protocol. For example, one embodiment may utilize Session Initiation Protocol (SIP). In other embodiments, the testing data may be transmitted and/or received utilizing other Voice Over IP (VoIP) protocols. For example, test data may also be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/internet Protocols (TCP/IP), or other protocols and/or systems suitable for transmitting and receiving test data.

Network paths 124, 126, 128, 130, 132, 138 and 140 may be wireless connections or may utilize cabled network or telecom connections such as an Ethernet RJ45/Category 5 Ethernet connection, a fiber optic connection, a traditional phone wireline connection, a cable connection or other wired network connection. Network paths 124, 126, 128, 130, 132, 138 and 140 may use standard wireless protocols including IEEE 802.11a, 802.11b, 802.11g, and 802.11n. One or more network elements may also be connected to network 102 and/or network 136 via protocols for a wired connection, such as an IEEE Ethernet 802.3.

Network elements 116, 118, and 122 may be one or more servers (or server-like devices), such as a Session Initiation Protocol (SIP) server, a FTP server, a web server, an application server, a DHCP server, a media server, a VPN server, and a gaming server. Network elements 116, 118, and 122 may include one or more processors (not shown) for recording, transmitting, receiving, and/or storing data. Although network elements 116, 118, and 122 are depicted as individual servers, it should be appreciated that the contents of a single network element may be combined into fewer or greater numbers of servers (or server-like devices) and may be connected to one or more data storage systems. For example, network element 122 may be combined with testing database 114. Additionally, portions of network elements 116, 118, and 122 functionality may be implemented on a client, such as network client 104.

Network elements 116 and 118 may be servers which may be utilized in testing. For example, network element 116 may be a FTP server containing downloadable files of known file sizes, types, or content. Network clients may be configured to connect to network element 116 to download and/or upload one or more files to test throughput and other performance or usability indicators.

Network clients 104 and 106 may be computers, phone dialers, personal digital assistants or other devices capable of sending test actions and/or receiving testing instructions. Network clients 104 and 106 may receive, transmit and/or generate test data. Network clients 104 and 106 may perform testing actions such as transmitting or receiving data utilizing tested network element 108 and/or tested network element 110. For example, tested network element 108 and/or 110 may be a broadband gateway, such as a Digital Subscriber Line (DSL) modem. Network client 104 may be a computer sending and receiving data, video, audio or telephony information via one or more tested network elements to ensure compatibility, performance, security and other quality assurance indicators of a tested network element.

Network client 104 may test hardware of a tested network element and/or software associated with a tested network element. Associated software may include operating systems, BIOS, firewalls, security software, gaming software and other applications. A network client may test compatibility of associated software, such as a firewall associated with a broadband access device, with network applications and services. For example, network client 104 may be a Personal Computer (PC) running Windows XP. Network element 108 may be a DSL gateway and network path 130 may be a DSL connection. Network connectivity device 112 may be a switch configured to place network client 104 and network element 108 on the same virtual LAN. Network client 104 may ensure that firewall software associated with network element 108 does not interfere with certain network services such as access to email. Other aspects of network element 108 tested may include, but are not limited to, throughput, latency, Network Address Translation (NAT), network address assignment and security. Network address assignment tests may verify a tested network products compatibility with Dynamic Host Configuration Protocol (DHCP), Point to Point Protocol over Ethernet (PPPoE), static address assignment methods, and/or other address assignment methods. Security tests may include port scanning, virus scanning, configuration verification, software patch level verification and other security measures. Security testing may also include known vulnerability testing.

Network clients 104 and 106 may be different hardware platforms and/or operating systems, such as PCs, Macs, Unix boxes or other platforms. Network clients 104 and 106 may include different patch levels, application software, and configuration settings. Network clients 104 and 106 may be imaged, upgraded, patched and/or configured to enable tests which require a different platform or version of a platform. Network clients 104 and 106 may utilize virtualization to emulate a variety of software and hardware platforms. Testing may utilize a virtual machine, a virtual platform, a virtual system and/or other virtual resources. Virtualization may emulate multiple clients concurrently and may facilitate testing.

Network clients 104 and 106 may contain multiple network interfaces. Multiple network interfaces, such as multiple network cards in a PC, may enable testing control to access a client during testing using a first network interface without affecting testing network traffic on a second network interface. Multiple network interfaces may enable a platform emulating multiple clients to provide separate network interfaces for each client. Network clients 104 and 106 may utilize network paths 124 and 126 for testing and may contain additional network connections such as network path 128 for control or monitoring of testing. For example, network client 106 may utilize network path 128 and a separate network interface to enable monitoring of test results without affecting network test traffic on network path 126. In some embodiments, testing data and control data may share a network interface.

Network element 122 may be a testing server which may facilitate test automation and dynamic test environment configuration. Network element 122 may enable configuration of the test environment including, but not limited to, configuring a virtual LAN, setting one or more parameters of a network technology, setting a service profile of a network element, enabling network address assignment, creating an account, setting a permission, and/or configuration of a client. Configuration of a client may include: imaging a client, downloading a script to a client, patching a client, upgrading a client, loading software on a client, changing a setting on a client, and/or executing a script on a client. Setting one or more parameters of a network technology and/or setting a service profile of a network element may include setting an upload and/or a download speed, specifying a quality of service, specifying one or more network addresses, and/or setting other network connectivity attributes.

Network element 122 may enable scheduling of one or more tests. Network element 122 may manage the use of one or more testing resources such as network clients 104 and 106, network connectivity device 112, tested network elements 108 and 110, and network paths 124, 126, 128, 130, 132, 138 and 140. Scheduling may enable prioritization of tests and may enable prioritized test to reserve one or more testing resources. Scheduling may permit concurrent tests to run in a test environment and may avoid conflicting demands for testing resources. In some embodiments, certain resources may be shared, such as a DHCP server or an FTP server, and sharing resources may facilitate concurrent tests. Other resources, such as a network client, may be scheduled and may run tests sequentially. One or more testers or other users may use an interface, such as testing interface 120, to interact with network element 122 and/or other network accessible test resources. Testers may schedule tests according to a desired priority. In some embodiments, network element 122 may schedule tests according to availability of one or more network resources. For example, a first test may require network client 104, network element 108 and network path 130. A second test may require network client 106, network element 108 and network path 130. Network element 122 may give priority to the first test if it determines that network client 104 is scheduled to be available prior to network client 106. Network element 122 may enable cancellation of a scheduled test, prioritization of a scheduled test, viewing a scheduled test, cancellation of a running test, rescheduling of a test that encountered an error, and reporting on scheduled tests. Network element 122 may apply one or more business rules when scheduling a test and/or configuring a test environment. For example, network element 122 may determine which equipment may be used with which network connections, which equipment may be used with which network speeds or settings, and other compatibility or policy issues. Business rules may also determine which types of network services, such as streaming video, are offered with which equipment, and/or which network technologies.

Network element 122 may enable handling one or more errors resulting from a test action. Error handling may include notification to one or more users, retrying of a test action, cancellation of a test action, rescheduling a test action, and cancellation of a test action. Network element 122 may also provide notification of a test result, test completion, or other test conditions specified by a user. Notifications may be sent via email, text message, page, a user display, a printout, or via other electronic means. Network element 122 may also provide recording, reporting and/or analysis of one or more test results. Network element 122 may utilize testing database 114 for storage of test data including test scripts, configuration data, test results, test schedules and other data facilitating test automation and dynamic test environment configuration. Network element 122 may contain a web server and may provide a user interface, such as a web interface to testing interface 120. One or more operations performed by network element 122 may be performed by other network elements, such as network elements 116 and 118, testing interface 120 or by network clients 104 and 106. Modules and/or network elements for facilitating test automation and dynamic test environment configuration are discussed in more detail with reference to FIG. 2 below.

Testing database 114 may be network accessible storage and may be local, remote, or a combination thereof to network elements 116, 118, and 122. Testing database 114 may utilize a Redundant Array of Inexpensive Disks (RAID), tape, disk, a Storage Area Network (SAN), or other computer accessible storage.

Testing interface 120 may enable a tester, a test lead or other users to view, modify, schedule and cancel tests. Testing interface 120 may enable a user to view testing reports, statistics, available test resources, test resource configuration and other test related information. Testing interface 120 may be a thin client or a thick client. In some embodiments, testing interface 120 may be a web client. In one or more embodiments, testing interface 120 may perform one or more of the functionalities described in reference to network element 122 above.

Reports on testing activity may be stored according to International Standards Organization (ISO) standards. Testing interface 120 may enable test results to be compared with additional test data and may enable the generation of graphs, statistics and other analytical tools for understanding and reviewing test results. One or more network elements, such as network element 118, may be a web server and may enable a web based testing interface. Test results may be viewed as web pages and may contain various graphics, colors or indicators to facilitate the understanding of test results. For example, test errors may be displayed in red, test successes may be displayed in green, or other indicators may be used.

Testing interface 120 may enable a user to perform test environment configuration. Testing interface 120 may provide a graphical user interface containing dropdowns, menus, buttons, text fields and other controls or inputs which may enable a user to configure a test environment, manage one or more tests, and/or view test results, reports and statistics. For example, a tester may wish to test customer premises equipment, such as a DSL modem. The tester may choose from a dropdown, a menu, may input a name or may otherwise specify the desired equipment to test. The tester may then specify a corresponding network technology, such as a DSL connection. Other variables and test conditions may be specified including, but not limited to, a download speed, an upload speed, and other network connection parameters. A tester may further use testing interface 120 to specify a network client for the customer premises equipment. Testing interface 120 may enable the specification of a hardware platform, a software platform, and other client details. For example, a tester may choose between a Mac, a PC, a Unix box and other platforms. The tester may then specify an operating system such as Mac OS X Leopard, Windows XP, Redhat Enterprise Linux 5 Desktop, or other operating systems. Testing interface 120 may enable a tester to view and/or set other details such as a minimum amount of RAM or disk space available on a client, a patch level, and/or one or more applications required on a client. In some embodiments, testing interface 120 may enable a tester to specify a client which may be a specialized device adapted to test a particular network service. For example, a programmable phone dialer or other telephony equipment may be utilized to test a voice over IP connection or a digital video recorder may be utilized to test a downloadable or streaming video service.

Testing interface 120 may enable a tester or other user to specify a server or other network device to facilitate testing. A user or other tester may specify a server for a network client and/or tested equipment to ping to test latency and connectivity between a network client and/or tested equipment and the server. A user may utilize testing interface 120 to specify a FTP server to download files from or to upload files to in order to test bandwidth. Testing interface 120 may test connectivity by utilizing additional network diagnostic tools such as traceroute. Other network elements, such as, but not limited to, web servers, media servers, mail servers, databases, firewalls, VPNs and security vulnerability servers may also be utilized for testing. In some embodiments, one or more servers may be specified by a testing server, such as network element 122, in response to a user's selection of a particular test type.

If a user specifies a client configuration different from a client specified or different from an available client, testing interface 120 may utilize one or more additional network elements to configure a client according to the specifications. For example, testing interface 120 may work with network element 122 to enable imaging a client, loading a disk image file on a client, installing a test script on a client, patching a client, upgrading a client or performing other client configuration actions. Other network elements may receive information from testing interface 120 which may be utilized to further configure the test environment. For example, network connectivity device 112 may receive information prompting it to configure a VLAN in response to a user's specification of a particular network client and customer premises equipment.

Testing interface 120 may enable a user to record and play back one or more testing actions. For example, a user may record sending and/or receiving an email with an attachment. The action may then be loaded as a script onto a client and may be replayed one or more times in order to test email compatibility issues. Other actions, such as requesting a large database query from a networked accessible database, downloading video, audio or other media files, requesting streaming media connections, and videoconferencing may also be recorded and replayed on one or more network clients. Testing interface 120 may enable a user to record the desired test action and may work with one or more additional network elements to ensure that a client has a compatible application stack, is properly configured, and is enabled to play back the recorded test action. An application stack may include not only an operating system but also client utilities, applications, and tools.

In one or more embodiments, testing interface 120 may enable a user to specify multiple clients for a desired test scenario. Testing interface 120 may work with one or more additional network elements to configure multiple clients or to configure a single platform to emulate multiple virtual clients. This may enable a user to test one or more pieces of customer premises equipment connected to a simulated LAN environment.

Testing interface 120 may have different levels of users with different functionality, permissions and displays available to each. For example, a first level may schedule one or more tests. The first level user may be able to view and manage their own tests. A second level user, such as a test lead or a manager, may be able to view test results for multiple users. Testing interface 120 may provide a login or other security measures which may verify an identify of a user and may provide functionality corresponding to the permissions of the user. Permissions may be set at a user level, a group level, a test level, a test environment level, a test type, a network technology type, or based on other user, test and/or test resource attributes.

In one or more embodiments, testing may be performed on network elements, such as mail servers, media servers, FTP servers, DHCP servers, web servers, routers, switches, hubs, firewalls, VPNs and other network accessible devices and software. Testing interface 120 may enable the specification of and the configuration of such network elements.

The various components of system 100 as shown in FIG. 1 may be further duplicated, combined and/or integrated to support various applications and platforms. Additional elements may also be implemented in the systems described above to support various applications.

Figure 2:
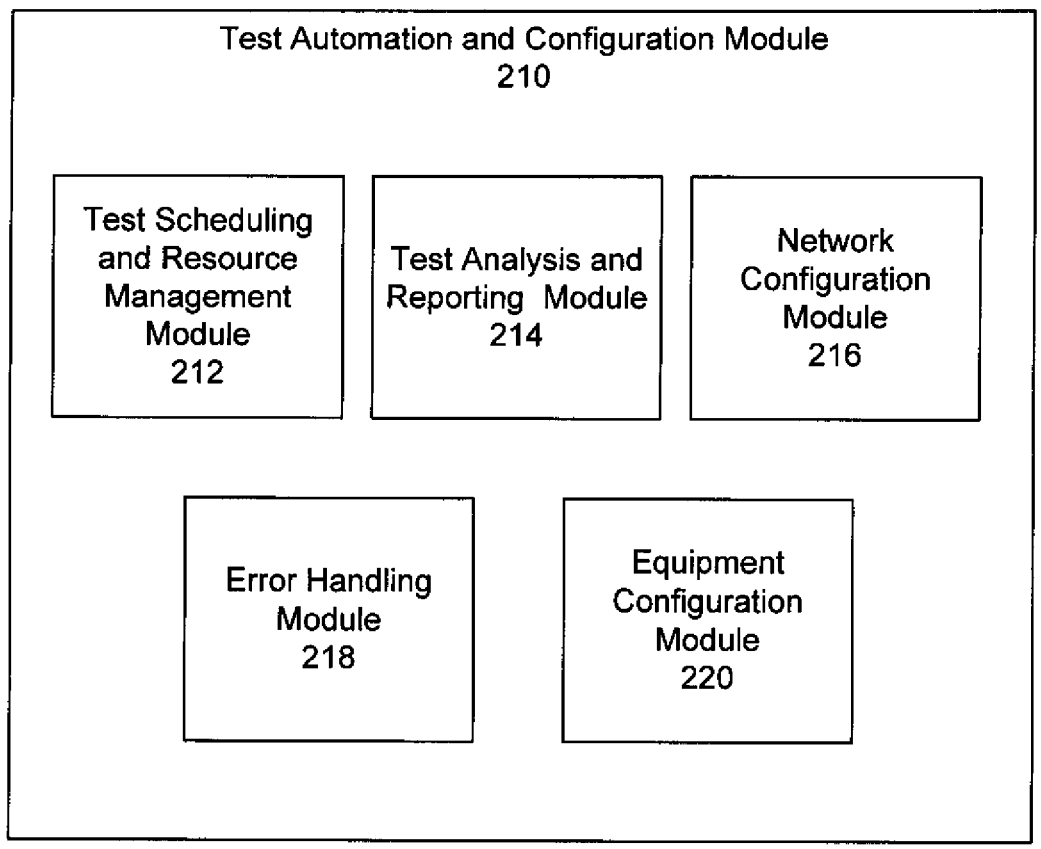
FIG. 2 depicts a module for managing a test automation and dynamic test environment configuration system, in accordance with an exemplary embodiment.

Referring to FIG. 2, a module for managing a test automation and dynamic test environment configuration system is depicted, in accordance with an exemplary embodiment. As illustrated, FIG. 2 depicts a test automation and configuration module 210. Test automation and configuration module 210 may contain one or more components including test scheduling and resource management module 212, test analysis and reporting module 214, network configuration module 216, error handling module 218, equipment configuration module 220 and other modules to facilitate automated testing and dynamic test environment configuration. Modules may be contained on one or more network elements, such as network elements 116, 118, 122, testing database 114, network clients 104 and 106 and on other network accessible elements. Test automation and configuration module 210 may access one or more network elements to send or receive test or control data. Test automation and configuration module 210 may utilize network paths reserved for management or control channels, such as network path 128, and may avoid interfering with bandwidth or network paths reserved for testing.

Test scheduling and resource management module 212 may facilitate test scheduling of one or more test actions. Testing scheduling and resource management module 212 may present a calendar or other display showing scheduled testing to a user via testing interface 120. Test scheduling and resource management module 212 may facilitate the scheduling, viewing, cancellation and monitoring of one or more tests, test environments and/or test resources. Test scheduling and resource management module 212 may track test resources such as network paths, network connectivity devices, tested network elements, servers, network clients and other resources. Test scheduling and resource management module 212 may utilize storage such as testing database 114 to track resource status, test plans, test definitions, test results and other test related data. Test scheduling and resource management module 212 may receive input from a user interface such as testing interface 120 or may receive input from other network elements. Test scheduling and resource management module 212 may query one or more resources to determine a resource status. Test scheduling and resource management module 212 may facilitate concurrent testing and efficient use of testing resources.

Test analysis and reporting module 214 may receive, transmit, analyze and report on test data. Test analysis and reporting module 214 may receive near real time data or may access stored data, Reports and/or analysis may be standard reports scheduled as part of a testing process or may be customized reports and/or analysis requested by a user. Reports may be provided and delivered in variety of formats including email, web, electronic message, printout and other formats. Reports may include data and/or analysis from one or more tests.

Network configuration module 216 may enable the configuration of one or more network environments. Network configuration may include the configuration of a Virtual Local Area Network (VLAN), a Virtual Private Network (VPN), and/or a Virtual Private LAN Service (VPLS). Network configuration may also include configuring a network address or network address assignment properties of one or more clients, configuring other network connectivity settings of one or more clients, configuring network settings of equipment to be tested, configuring network settings of servers, and configuring network settings of routers, hubs, switches, repeaters, wireless access devices and other network connectivity devices. Network configuration module 216 may provision or configure network paths such as routing tables, circuits, channels, links or other network paths or network path configuration information. Network configuration module 216 may receive information specifying a desired test environment and may configure network paths, a VLAN and/or other settings and components to provide connectivity among elements of the specified test environment. Network configuration module 216 may enable one or more business rules to be applied when configuring a network environment. Network configuration module 216 may ensure that compatible network technologies are tested with the devices to be tested, that compatible network settings are chosen for a device, and that other business rules are applied. For example, network configuration module 216 may provide an error if a tester selects a DSL router and attempts to test it with a fiber optic network connection. In some embodiments, lists of available resources in a user interface may dynamically update to display compatible, permissible and available network resources when a tester is configuring a test environment utilizing network configuration module 216.

Error handling module 218 may respond to one or more errors of a test environment. Error handling module 218 may enable error trapping of an error and one or more error handling actions. Error handling module 218 may retry a test action resulting which previously resulted in an error, cancel a test action previously resulting in a test error, or provide reporting or notification of a test error.

Equipment configuration module 220 may enable the configuration of one or more test components. Equipment configuration module 220 may image, configure, update, upgrade and/or otherwise alter the settings of network clients 104 and 106, network connectivity device 112, tested network elements 108 and 110, network elements 116, 118 and 122 and/or other network resources. Equipment configuration module 220 may provide test scripts, testing programs, recorded test actions, test tools or other resources to network clients or other network elements. Equipment configuration module 220 may create accounts, grant permission, allocate space or otherwise prepare testing resources.

Test automation and configuration module 210 may contain fewer or greater numbers of modules. Modules may be combined. Modules may be local or remote to one another and may be implemented on different network elements. Modules may be implemented in software and/or hardware. Test automation and configuration module 210 may interface with one or more external systems and/or resources. Test automation and configuration module 210 may query external databases, files, interfaces and/or APIs to obtain resources and data for testing.

Figure 3:
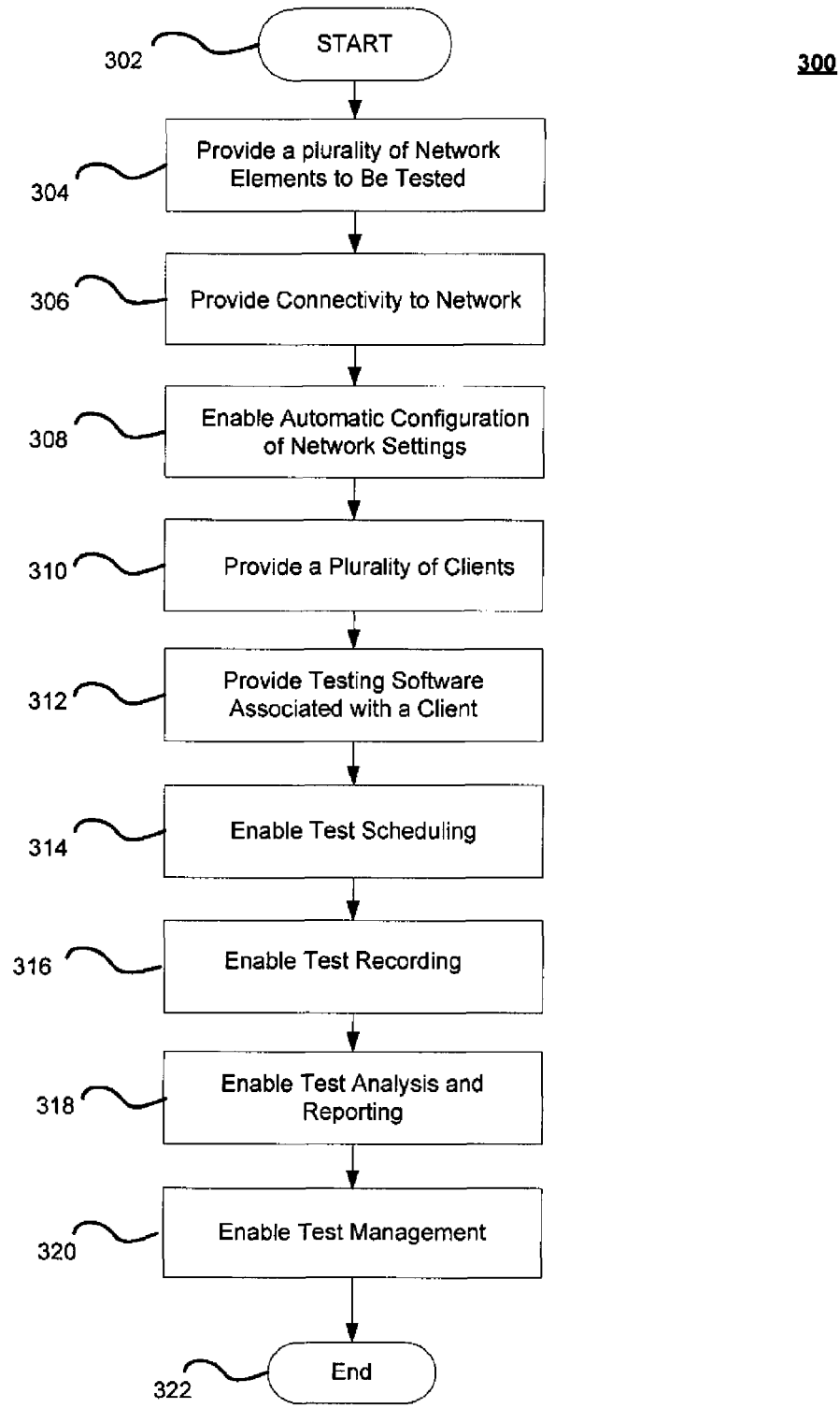
FIG. 3 depicts a method for implementing a test automation and dynamic test environment configuration system, in accordance with an exemplary embodiment.

FIG. 3 illustrates a flow diagram of a method 300 for implementing a test automation and dynamic test environment configuration system, in accordance with exemplary embodiment. This exemplary method 300 is provided by way of example, as there are a variety of ways to carry out the method. The method 300 shown in FIG. 3 can be executed or otherwise performed by one or a combination of various systems. The method 300 as described below may be carried out by the test automation and dynamic test environment configuration system 100 shown in FIG. 1 and test automation and configuration component 210 shown in FIG. 2 by way of example, and various elements of the FIGS. 1 and 2 are referenced in explaining exemplary method 300 of FIG. 3. Each block shown in FIG. 3 represents one or more processes, methods or subroutines carried out in exemplary method 300. Referring to FIG. 3, exemplary method 300 may begin at block 302.

At block 304, a plurality of network elements to be tested may be provided. For example, customer premises equipment, network servers, network connectivity devices may be provided and/or allocated for a test.

At block 306, connectivity for one or more network elements may be provided. In some embodiments, one or more network paths, routes, circuits, and/or channels may be provisioned, configured and/or reserved for testing. Bandwidth and other attributes may be verified. Network management utilities may be utilized to determine network element status and availability. One or more testing databases may also be queried, such as testing database 114. In some embodiments, network elements, such as network elements 116 and 118 may be queried directly to determine status, availability and other attributes.

At block 308, automatic configuration of network settings may be enabled. Network elements to be tested may be connected to one or more network connectivity devices, such as network connectivity device 112, which may enable the dynamic configuration of one or more test environments for one or more test cases.

At block 310, a plurality of network clients, such as network clients 104 and 106 may be provided. Network clients may be representative of equipment currently supported or potential equipment to be supported by a network operator, owner or service provider. Network clients may be various platforms with different operating systems, hardware, and application stacks. Network clients may be remotely configurable.

At block 312, testing software associated with a client may be provided. Testing software may include test scripts, recorded test actions, load simulators, or other test tools.

At block 314, test scheduling may be enabled. Scheduling may include cancellation of a scheduled test and rescheduling of a test. Test scheduling may reserve resources and detect resource conflicts. Test scheduling may enable the scheduling of test according to a priority of a test, a submitter of a test, the first test with all resources available for it, a test with estimated system load, a test with an estimated bandwidth usage or other factors.

At block 316, test recording may be enabled. Test results may be stored in ISO standard formats or in other formats. Test results may be stored as XML, text, a spreadsheet, comma separated values, one or more database formats or other formats.

At block 318, test analysis and reporting may be enabled. Analysis may enable the comparison of multiple sets of test results. Charting and graphing of one or more test results or of analysis of test results may be enabled. Delivery of test results, analysis and other reporting may be enabled via multiple delivery mechanisms including web servers, email, electronic messages, web services and other electronic delivery mechanisms At block 320, test management may be enabled. Test management may provide one or more user interfaces and/or Application Programming Interfaces (APIs) which may facilitate access to one or more test automation and dynamic test environment configuration components.

At block 322, the method may end.

Figure 4:
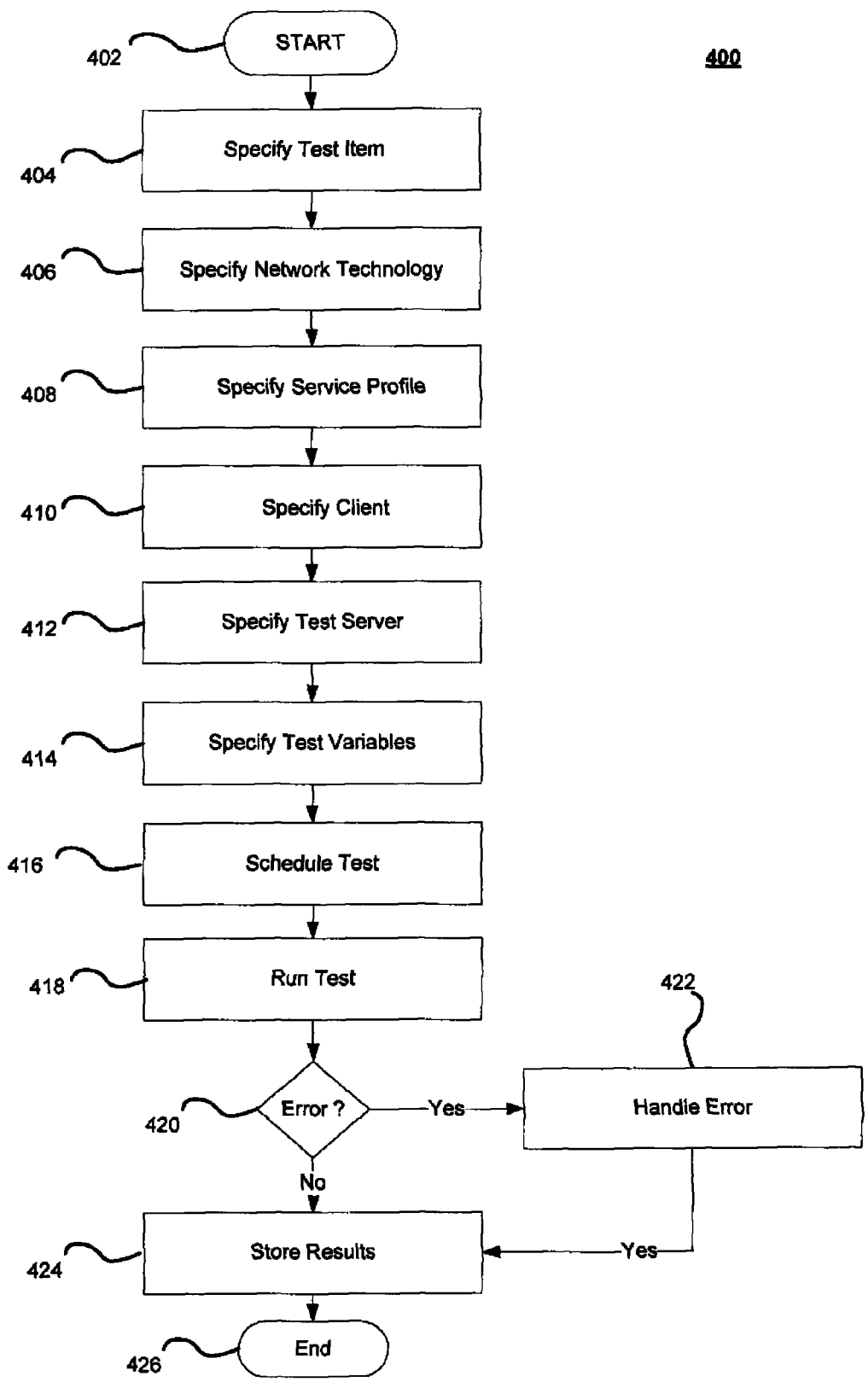
FIG. 4 depicts a method of testing utilizing a test automation and dynamic test environment configuration system, in accordance with an exemplary embodiment.

FIG. 4 illustrates a flow diagram of a method 400 of testing utilizing a test automation and dynamic test environment configuration system, in accordance with exemplary embodiment. This exemplary method 400 is provided by way of example, as there are a variety of ways to carry out the method. The method 400 shown in FIG. 4 can be executed or otherwise performed by one or a combination of various systems. The method 400 is described below may be carried out by the test automation and dynamic test environment configuration system 100 shown in FIG. 1 and test automation and configuration component 210 shown in FIG. 2 by way of example, and various elements of the FIGS. 1 and 2 are referenced in explaining exemplary method 400 of FIG. 4. Each block shown in FIG. 4 represents one or more processes, methods or subroutines carried out in exemplary method 400. Referring to FIG. 4, exemplary method 400 may begin at block 402.

At block 404, the item to be tested may be specified. A tester or other user may specify a device or software using a testing interface, such as testing interface 120. A drop down, list box, combo box, menu or other user interface control may present a list of devices and/or software. The list may be filtered based on a user, a test type, permissions, resource availability, or other factors.

At block 406, a user may specify the network technology to be tested with the software or device being tested. For example, the network technology may be Fiber To The Premises (FTTP) such as FIOS. The networking technology may also be digital subscriber line, asymmetric digital subscriber line, symmetric digital subscriber line, cable modem broadband, leased line, integrated services digital network, dial-up, satellite, wireless networking, broadband over power lines and/or other networking technologies.

At block 408, a service profile or other network settings may be specified. For example, a speed of the network connection may be specified.

At block 410, a network client to be used for testing may be specified. For example network clients 104 or 106 may be specified. A user may specify a hardware platform, an operating system, an operating system version, an operating system patch level, one or more applications and/or other client attributes. For example, a user may specify minimum RAM, disk space or other capabilities of a client.

At block 412, a test server may be specified. This may be one or more network elements used during the testing of an item. For example, a media server may be utilized to determine a test item's performance in handling streaming video or audio. A test server may also be a security server used to run port scans and/or other security tests on an item being tested.

At block 414, one or more test variables may be specified. Test variables may specify a script to be executed, a test name, a number of tests, a duration of tests, one or more values to be used in a test script or other details.

At block 416, a user may utilize a testing interface to schedule a test. Tests may be scheduled to run around the clock and may run automatically without tester supervision or interaction. Thus, a quality assurance team may schedule tests to run around the clock and seven days a week. The testing team may review the test results during normal working hours. In some embodiments, a testing interface may be a web based interface which may be remotely accessible. Testers or other users may schedule the tests during the day and may remotely access them if they are notified of a problem or if they desire to reschedule, cancel and/or monitor the tests.

At block 418, the test may run. Multiple tests may be run concurrently for one or more users. In some embodiments, a user may be able to view test status and feedback as a test runs. For example, a user may be able to view commands issued from a network client and the responses received from tested equipment and/or one or more network elements.

At block 420, the method 400 may determine if an error has occurred during the running of the test. If an error has occurred the method may continue at block 422. If no error has occurred the method may continue at block 424. In some embodiments, a maximum wait time may be set for one or more test actions to complete. If a response is not received from a network element or if a test action does not complete within a specified time, the test action may timeout. If a timeout or another error occurs, it may be handled at block 422.

At block 422, an error detected during the running of the test may be handled. Error handling may involve reporting errors, providing notifications, retrying test actions, canceling test actions, pausing a test process and/or rescheduling test actions.

At block 424, the test results may be stored for viewing, analysis, printing, reporting, notification and/or other usage.

At block 426, the method may end.

In some embodiments, test resources may be centrally located. One or more equipment racks may be utilized to store multiple clients and/or multiple devices to be tested. The use of a network connectivity device, such as a switch capable of dynamically configuring a VLAN, may greatly reduce the amount of cabling and other connections required among test equipment. The use of clients which may be dynamically configured and/or virtualized or emulated may improve test resource flexibility and availability while reducing the number of physical equipment required to support testing. A testing database and a testing interface associated with a test automation and dynamic test environment configuration system may facilitate scheduling and resource management while reducing manual device and network configuration effort. Test scheduling and automation may enable a greater amount of testing time as users may not be required to be present during testing. A network accessible interface to a test automation and dynamic test environment configuration system may enable a centrally located system to be remotely accessible to one or more users.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   utilizing a user interface for automated testing of a network device wherein automated testing comprises:
      specifying a network device to be tested;
      specifying a network technology for testing the network device;
      specifying a client of the network device;
      configuring network connectivity for the network device, wherein configuring network connectivity includes dynamically configuring a network to include the specified network technology and the specified network device;
      utilizing the client of a network device for a test action; and
      allowing a user to view at least one of a test status and feedback during the automated testing.

2. The method of claim 1, wherein the network device comprises at least one of: a broadband router, a modem, a set top box, a digital video recorder, a voice over IP analog telephony adapter, a wireless access point, and an optical network terminal.

3. The method of claim 1, wherein the automated testing enables the testing of multiple clients and multiple network devices.

4. The method of claim 1, wherein automated testing further comprises configuring the client of a network device.

5. The method of claim 4, wherein configuration of the client comprises at least one of: imaging a client, downloading a script to a client, patching a client, upgrading a client, loading software on a client, changing a setting on a client, and executing a script on a client.

6. The method of claim 1, further comprising scheduling of one or more automated tests.

7. The method of claim 6, wherein scheduling comprises managing the use of at least one of: a network device and a network technology for a plurality of tests.

8. The method of claim 6, wherein the scheduling includes at least one of cancellation of a scheduled test, prioritization of a scheduled test, viewing a scheduled test, and concurrent scheduled tests.

9. The method of claim 1, further comprising handling one or more errors resulting from the test action.

10. The method of claim 1, further comprising providing notification of at least one of a test error, a time out, a test result and test completion.

11. The method of claim 1, further comprising recording one or more test results.

12. The method of claim 1, further comprising reporting one or more test results.

13. The method of claim 1, wherein the network technology comprises at least one of: digital subscriber line, asymmetric digital subscriber line, symmetric digital subscriber line, fiber to the premises, cable modem broadband, leased line, integrated services digital network, dial-up, satellite, wireless networking, Internet Protocol over coaxial cable, and broadband over power lines.

14. The method of claim 1, wherein the test action comprises at least one of: a security test, a bandwidth test, a compatibility test, a performance test, and a compliance test.

15. The method of claim 1, further comprising performing analysis on one or more test results.

16. The method of claim 1, wherein the client comprises at least one of a virtual machine, a virtual platform, a virtual system, and a virtual resource.

17. The method of claim 1, wherein dynamically configuring a network comprises configuring a network connectivity device connected to a tested network element and a network technology to provide at least one of a virtual local area network, a virtual private network, and a virtual private LAN service.

18. The method of claim 1, wherein configuring network connectivity for the network device comprises at least one of: setting one or more parameters of a network technology, setting a service profile of a network element, enabling a network address assignment, creating an account, and setting a permission.

19. A computer readable media comprising code to perform the acts of the method of claim 1.

20. A system, comprising:
   a database for storing test data;
   a user interface for automated testing of a network device; and
   a network element communicatively coupled to a network wherein the network element is configured to:
      automate testing of a network device wherein automated testing comprises:
         specifying a network device to be tested;
         specifying a network technology for testing the network device;
         specifying a client of the network device;
         configuring network connectivity for the network device;
         utilizing the client of a network device for a test action; and
         allowing a user to view at least one of a test status and feedback during the automated testing.

21. The system of claim 20, wherein the automated testing comprises the testing of multiple clients and multiple network devices.

22. The system of claim 20, wherein the network element is further configured to schedule one or more automated tests.

* * * * *